US012390709B2

(12) United States Patent
Orsbon et al.

(10) Patent No.: US 12,390,709 B2
(45) Date of Patent: Aug. 19, 2025

(54) BASKETBALL TRAINING SYSTEMS AND METHODS OF USE

(71) Applicant: AllZones LLC, Charlotte, NC (US)

(72) Inventors: R. Anthony Orsbon, Charlotte, NC (US); Thomas M. House, Mint Hill, NC (US)

(73) Assignee: AllZones LLC, Charlotte, NC (US)

( * ) Notice: Subject to any disclaimer, the term of this patent is extended or adjusted under 35 U.S.C. 154(b) by 235 days.

(21) Appl. No.: 18/301,530

(22) Filed: Apr. 17, 2023

(65) Prior Publication Data

US 2023/0330502 A1 Oct. 19, 2023

Related U.S. Application Data

(60) Provisional application No. 63/363,039, filed on Apr. 15, 2022.

(51) Int. Cl.
*A63B 69/00* (2006.01)
*A63B 71/06* (2006.01)
*A63B 24/00* (2006.01)

(52) U.S. Cl.
CPC ...... *A63B 69/0071* (2013.01); *A63B 71/0605* (2013.01); *A63B 71/0622* (2013.01); *A63B 2024/0025* (2013.01); *A63B 2024/0034* (2013.01); *A63B 2225/093* (2013.01)

(58) Field of Classification Search
CPC ................................................ A63B 69/0071
See application file for complete search history.

(56) References Cited

U.S. PATENT DOCUMENTS

| 5,035,423 | A | 7/1991 | Arciniega |
| 5,171,009 | A | 12/1992 | Filewich et al. |
| 5,330,175 | A | 7/1994 | Kim |
| 5,364,091 | A | 11/1994 | Sebek |
| 5,365,427 | A | 11/1994 | Soignet et al. |
| 6,389,368 | B1 | 5/2002 | Hampton |
| 7,094,164 | B2 | 8/2006 | Marty et al. |

(Continued)

FOREIGN PATENT DOCUMENTS

| AU | 2020319631 A1 | 2/2022 |
| CN | 113633945 A | 11/2021 |

(Continued)

*Primary Examiner* — Jay Trent Liddle
(74) *Attorney, Agent, or Firm* — GREENBERG TRAURIG LLP

(57) ABSTRACT

According to another embodiment, a method may include: receiving, at a centralized controller, a play data for players using a plurality of basketball hoop devices, the play data comprising shot data comprising ball flight trajectory data, shot angle data, shot distance data, and shot success data; calculating, by the centralized controller, a skill level for each of the plurality of players using the play data; applying, by the centralized controller, a skill leveling algorithm to the shot data to determine parameters for each basketball hoop device based on the skill level of each of the players, wherein the parameters comprise a hoop height, a hoop angle, and a hoop distance; and communicating, by the centralized controller, the parameters to local controllers at the respective basketball hoop device, wherein the local controllers control actuators at the respective basketball hoop devices to implement the parameters.

20 Claims, 8 Drawing Sheets

(56) References Cited

U.S. PATENT DOCUMENTS

| | | |
|---|---|---|
| 7,841,957 B1 | 11/2010 | Wares |
| 7,854,669 B2 | 12/2010 | Marty et al. |
| 7,938,746 B2 | 5/2011 | Chipperfield |
| 8,597,095 B2 | 12/2013 | Crowley et al. |
| 8,617,008 B2 | 12/2013 | Marty et al. |
| 8,622,832 B2 | 1/2014 | Marty et al. |
| 8,852,030 B2 | 10/2014 | Campbell et al. |
| 8,908,922 B2 | 12/2014 | Marty et al. |
| 8,948,457 B2 | 2/2015 | Marty et al. |
| 9,017,188 B2 | 4/2015 | Joseph et al. |
| 9,129,153 B2 | 9/2015 | Lanni et al. |
| 9,186,568 B2 | 11/2015 | Lanni et al. |
| 9,199,150 B2 | 12/2015 | Wackerly |
| 9,233,292 B2 | 1/2016 | Joseph et al. |
| 9,238,165 B2 | 1/2016 | Marty et al. |
| 9,283,431 B2 | 3/2016 | Marty et al. |
| 9,283,432 B2 | 3/2016 | Marty et al. |
| 9,345,929 B2 | 5/2016 | Marty et al. |
| 9,486,692 B2 | 11/2016 | Crowley et al. |
| 9,566,490 B2 | 2/2017 | Hoffman |
| 9,589,207 B2 | 3/2017 | Holohan |
| 9,623,311 B2 | 4/2017 | Thurman et al. |
| 9,656,142 B2 | 5/2017 | Thurman et al. |
| 9,656,143 B2 | 5/2017 | Thurman et al. |
| 9,697,617 B2 | 7/2017 | Marty et al. |
| 9,844,704 B2 | 12/2017 | Thurman et al. |
| 9,901,801 B2 | 2/2018 | Thurman et al. |
| 10,159,884 B2 | 12/2018 | Thurman et al. |
| 10,159,888 B2 | 12/2018 | Lanni et al. |
| 10,343,015 B2 | 7/2019 | Marty et al. |
| 10,471,325 B2 | 11/2019 | Marty et al. |
| 10,500,464 B2 | 12/2019 | Gordon et al. |
| 10,507,369 B2 | 12/2019 | Gordon et al. |
| 10,518,153 B2 | 12/2019 | Joseph et al. |
| 10,532,248 B2 | 1/2020 | Crowley et al. |
| 10,537,780 B2 | 1/2020 | Joseph et al. |
| 10,610,757 B1 | 4/2020 | Marty |
| 10,664,690 B2 | 5/2020 | Holohan |
| 10,675,523 B2 | 6/2020 | Joseph et al. |
| 10,688,362 B1 | 6/2020 | Sangalang |
| 10,737,162 B2 | 8/2020 | Joseph et al. |
| 10,762,642 B2 | 9/2020 | Marty et al. |
| 10,814,199 B1 | 10/2020 | Wu et al. |
| 10,870,045 B2 | 12/2020 | Joseph et al. |
| 11,083,944 B2 | 8/2021 | Joseph et al. |
| 11,083,945 B2 | 8/2021 | Joseph et al. |
| 11,123,605 B1 | 9/2021 | Marty |
| 11,135,500 B1 | 10/2021 | Campbell et al. |
| 11,141,641 B2 | 10/2021 | Joseph et al. |
| 11,154,761 B2 | 10/2021 | Gordon et al. |
| 11,173,368 B2 | 11/2021 | Joseph et al. |
| 11,227,150 B2 | 1/2022 | Holohan |
| 2003/0073518 A1* | 4/2003 | Marty ............... A63B 69/0071 473/422 |
| 2008/0312010 A1* | 12/2008 | Marty ............... G06T 7/20 73/865.4 |
| 2012/0289296 A1* | 11/2012 | Marty ............... G06T 13/20 463/3 |
| 2013/0095959 A1* | 4/2013 | Marty ............... A63B 24/0021 473/448 |
| 2014/0195019 A1* | 7/2014 | Thurman ........... A63B 41/02 700/91 |
| 2014/0195020 A1* | 7/2014 | Thurman ........... A63B 60/46 700/91 |
| 2014/0195021 A1* | 7/2014 | Thurman ........... A63B 43/00 700/91 |
| 2014/0195022 A1* | 7/2014 | Thurman ........... G09B 19/0038 700/91 |
| 2014/0200692 A1* | 7/2014 | Thurman ........... G09B 19/0038 700/91 |
| 2014/0222177 A1* | 8/2014 | Thurman ........... A63B 41/02 700/92 |
| 2015/0306455 A1* | 10/2015 | DeCarlo ............ F41J 1/10 473/422 |
| 2017/0136333 A1 | 5/2017 | Joseph et al. |
| 2017/0157482 A1* | 6/2017 | DeCarlo ............ A63B 63/083 |
| 2018/0056124 A1* | 3/2018 | Marty ............... A63B 69/0071 |
| 2018/0147467 A1 | 5/2018 | Constantin |
| 2018/0304137 A1 | 10/2018 | McErlean et al. |
| 2019/0329114 A1* | 10/2019 | Marty ............... G07C 1/22 |
| 2020/0009443 A1 | 1/2020 | Moravchik et al. |
| 2020/0338422 A1 | 10/2020 | Joseph et al. |
| 2020/0353333 A1 | 11/2020 | Brown |
| 2021/0008416 A1* | 1/2021 | DeCarlo ............ A63B 24/0021 |
| 2021/0031089 A1 | 2/2021 | Spont |
| 2021/0187377 A1 | 6/2021 | McCarter |
| 2021/0283478 A1 | 9/2021 | Joseph et al. |
| 2021/0283480 A1 | 9/2021 | Joseph et al. |
| 2021/0283481 A1 | 9/2021 | Joseph et al. |
| 2021/0316197 A1 | 10/2021 | Ilhan et al. |
| 2021/0322846 A1 | 10/2021 | Joseph et al. |
| 2021/0322847 A1 | 10/2021 | Joseph et al. |
| 2021/0362023 A1 | 11/2021 | Joseph et al. |
| 2022/0054916 A1 | 2/2022 | Kshirsagar et al. |
| 2022/0180638 A1* | 6/2022 | Marty ............... G05D 1/0094 |
| 2022/0212077 A1* | 7/2022 | Anton .............. G06N 3/084 |
| 2023/0173367 A1* | 6/2023 | Marty ............... A63B 24/0021 473/433 |

FOREIGN PATENT DOCUMENTS

| | | |
|---|---|---|
| CN | 214633860 U | 11/2021 |
| CN | 214633862 U | 11/2021 |
| CN | 113750511 A | 12/2021 |
| CN | 215538338 U | 1/2022 |
| CN | 113877172 A | 6/2022 |
| EP | 2779141 B1 | 8/2020 |
| WO | 2015195739 A1 | 12/2015 |
| WO | 2021206698 A1 | 10/2021 |
| WO | 2022040289 A1 | 2/2022 |

* cited by examiner

BASKETBALL TRAINING SYSTEMS AND METHODS OF USE

RELATED APPLICATIONS

This application claims priority to, and the benefit of, U.S. Provisional Patent Application Ser. No. 63/363,039, filed Apr. 15, 2022, the disclosure of which is hereby incorporated, by reference, in its entirety.

BACKGROUND OF THE INVENTION

1. Field of the Invention

Embodiments generally relate to basketball training systems and methods of use.

2. Description of the Related Art

U.S. Pat. No. 6,918,591, the disclosure of which is hereby incorporated, by reference, in its entirety, discloses a basketball system that includes a movable platform and a pole rotatably mounted to the movable platform. The pole has at least one of a curved and an angled region and has an axis of rotation. The basketball system also includes a backboard mounted to the pole and a rim mounted to the backboard. The rim has a vertical central axis that is coaxial with the axis of rotation of the pole. In addition, the movable platform is horizontally adjustably mounted to a base.

The system may employ various sensors to control the operation of the system. For instance, the system may include a distance sensor for determining a distance between the pole and a player position. The system may also include a scoring sensor for determining when a ball passes through the rim. In addition, the system may include a rotational sensor for determining a rotation of the pole.

A rotation mechanism is employed for rotating the pole relative to the movable platform. Preferably, a controller is employed to control the operation of the rotation mechanism in accordance with either a program stored in the controller, a player preference provided via a user interface, or a signal from the rotational sensor. In addition, a horizontal adjustment mechanism is employed for horizontally adjusting the movable platform relative to the base. The controller may be configured to control the operation of the horizontal adjustment mechanism in accordance with either a program stored in the controller, a player preference provided via a user interface, or a signal from the distance sensor.

The system may also include a ball return system including at least one conveyor for returning a ball to a player. The ball return system may include a single belt conveyor; a ball rack accessible to a user; and a dual belt ball feed system for lifting a ball from the single belt conveyor to the ball rack. To reduce the likelihood of the balls jamming, each belt of the dual belt ball feed system is operated by a single motor so as to rotate at an identical speed. Preferably, the ball return system operates at a pace similar to the player pace of shooting. To accomplish this, the system may be configured such that the controller is coupled to a ball sensor located in a ball rack and to the ball return system, the controller being configured to control the operation of the ball return system in accordance with a signal received from the ball sensor.

SUMMARY OF THE INVENTION

Basketball training systems and methods of use are disclosed. For example, embodiments may include a hybrid single or multi-player basketball training system that includes both physical and virtual features, player skill level computation and tracking, player skill level matching, competition leveling, dynamic challenges, bet wagering, and includes a means for cloud computing and network connectivity between remote players and disparate basketball training systems.

According to an embodiment, a system may include a basketball hoop device comprising: a backboard; a hoop projecting from the backboard; and a plurality of sensors configured sense a location of a ball and a player, and a distance the ball and the player to the hoop, and to produce output signals corresponding to the sensed location of the ball, the sensed location of the player, the distance of the ball to the hoop, and the distance of the player from the hoop; an electronic device comprising a computer processor that executes a computer program that: receives the output signals from the plurality of sensors; identifies, from the output signals, a plurality of shots made by the player; for each of the plurality of shots, calculates play data comprising a trajectory of ball flight in the shot, an angle of the shot relative to the backboard, and a distance of the player relative to the backboard, and determines whether the shot was successful, and stores the trajectory, the angle, the distance, and whether the shot was successful in a database.

In one embodiment, the basketball hoop device further comprises a display that presents a virtual representation of the player.

In one embodiment, the basketball hoop device further comprises a user interface that presents the player with an option to play against a computer opponent, and the computer program generates the computer opponent based on the output signals.

In one embodiment, the basketball hoop device further comprises a card reader that receives payment from a credit or debit card.

In one embodiment, the basketball hoop device further comprises a payment interface that presents or receives a code for payment.

In one embodiment, the system further comprises a plurality of basketball hoop devices; and a centralized controller in communication with each of the plurality of basketball hoop devices that receives play data from each of the plurality of basketball hoop devices.

In one embodiment, the centralized controller determines a skill level of the player using each of the plurality of basketball hoop devices based on the play data.

In one embodiment, the centralized controller applies a skill leveling algorithm to the skill level of each player and communicates parameters to each of the plurality of basketball hoop devices based on the skill levelling algorithm.

In one embodiment, the parameters comprise a height of the hoop, a hoop angle, and a distance.

In one embodiment, the centralized controller matches players based on their skill levels.

In one embodiment, the centralized controller matches players using a machine learning algorithm.

In one embodiment, the basketball hoop device further comprises a user interface that receives a selection of a session type, wherein the session type is selected from one of a game, a training regime, and a tournament, a training regimen option comprises one of a jump shot, a hook shot, a bank shot, a free throw, a layup, and a slam dunk, and/or a game option comprise one of one-on-one, the Mikan Drill, around the world, single person p-i-g, and ten in a row; and the electronic device configures the basketball hoop device based on the selections.

According to another embodiment, a method may include: receiving, at a centralized controller, a play data for players using a plurality of basketball hoop devices, the play data comprising shot data comprising ball flight trajectory data, shot angle data, shot distance data, and shot success data; calculating, by the centralized controller, a skill level for each of the plurality of players using the play data; applying, by the centralized controller, a skill leveling algorithm to the shot data to determine parameters for each basketball hoop device based on the skill level of each of the players, wherein the parameters comprise a hoop height, a hoop angle, and a hoop distance; and communicating, by the centralized controller, the parameters to local controllers at the respective basketball hoop device, wherein the local controllers control actuators at the respective basketball hoop devices to implement the parameters.

In one embodiment, the method may further include: monitoring, by the centralized controller, additional play data from the plurality of basketball hoop devices; applying, by the centralized controller, the skill leveling algorithm to the shot data to determine parameter updates for each basketball hoop device based on the additional play data, wherein the parameter updates comprise a hoop height modification, a hoop angle modification, and a hoop distance modification; and communicating, by the centralized controller, the parameter updates to local controllers at the respective basketball hoop device, wherein the local controllers control actuators at the respective basketball hoop devices to implement the parameter updates.

In one embodiment, the skill leveling algorithm identifies parameters to make play easier for a first player having a lower skill level than a second player.

In one embodiment, the skill leveling algorithm identifies parameters to make play more difficult for a first player having a higher skill level than a second player.

In one embodiment, the method further includes storing, by the centralized controller, the skill level for each player.

In one embodiment, the method further includes: identifying, by the centralized controller, players in a plurality of players having the same skill level; and matching, by the centralized controller, the players having the same skill level with each other.

In one embodiment, the play data is from asynchronous training sessions.

In one embodiment, the plurality of players play the same game in real-time, wherein the game comprises one-on-one, The Mikan Drill, Around the World, P-I-G, or Ten in a Row.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to basketball training systems and methods of use.

Figure 1:
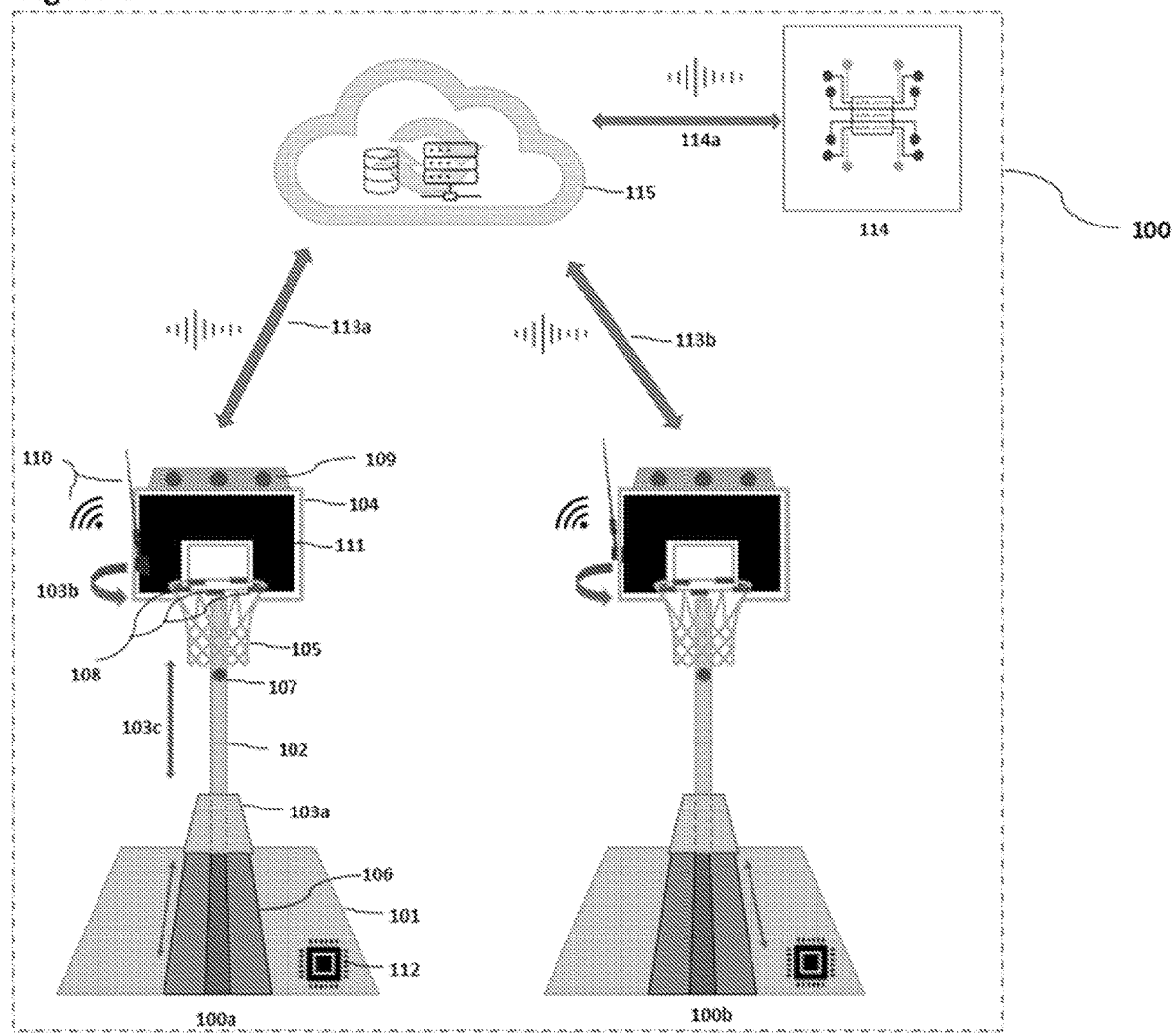
FIG. 1 depicts a basketball training device according to an embodiment.

Referring to FIG. 1, a basketball training system is disclosed according to an embodiment. System 100 may include a basketball training unit 100a and 100b. Each unit 100a, 100b may include a rigid platform 101, a rotatable post 102, a motorized mount 103a, rotation capability 103b, vertical translation capability 103c, a backboard 104, a goal (e.g., a hoop and net 105), a linear translational stage 106, a shot sensor 107, hoop sensors 108, image capture devices 109 (e.g., cameras), a network interface 110, a display 111, a local controller 112, cloud connectivity 113a, 113b, a central controller 114, and a cloud computing, storage, and streaming capability 115. The system 100 may include both physical and virtual features, and the local controller 112 may receive and process data output from various sensors and video cameras. Embodiments may be provided with cloud connectivity 113a, 113b, 114a, 115, and central or distributed servers and databases 115 may be provided to provide for data processing, video streaming, computations, central control and communications 114, and communication and game play, 113a and 113b, between multiple training systems, that are involved in a game, tournament, or training session to manage the context and state of the user's session.

Figure 6:
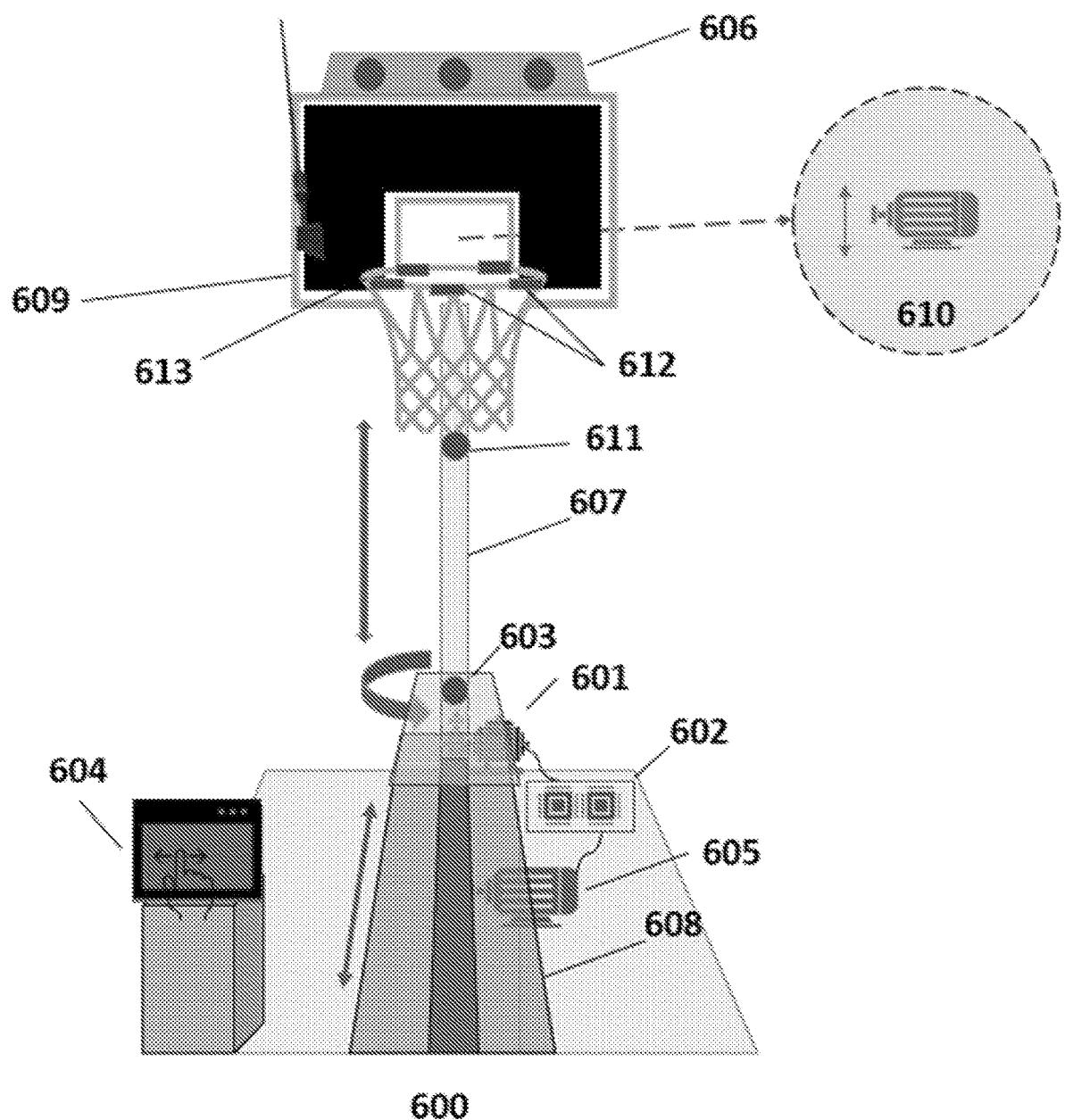
FIG. 6 depicts a system for controlling a basketball training system according to another embodiment.

FIG. 6 provides additional details on the basketball hoop device in FIG. 1. Basketball hoop device 600 may include a rotation mechanism 601 that may be employed for rotating the pole 607 relative to the movable platform. A local controller 602 may be employed to control the operation of the rotation mechanism in accordance with either a program stored in the controller 602, a player preference provided via a user interface 604, or a signal from the rotational sensor 603. In addition, a horizontal adjustment mechanism 605 may be employed for horizontally adjusting the movable platform relative to the base. The controller 602 may be configured to control the operation of the horizontal adjustment mechanism 605 in accordance with either a program stored in the controller 602, a player preference provided via a user interface 604, or a signal from the distance sensor 606.

Local controller 602 may also control vertical positioning motor 610 that may increase or decrease the height of the rim 613 on the pole 607.

Local controller 602 may be configured to control the operation of the basketball system 600. For instance, the controller 602 may be coupled to the rotation sensors 603 in order to determine a rotational position of the pole 607. In addition, the local controller 602 may be coupled to the rotation mechanism 601 in order to control, based upon signals received from the rotational sensors 603, the rotational position of the pole 607. The local controller 602 may also be configured to control the rotational position of the pole 607 based on a predetermined program stored in the local controller 602 or in response to player preferences provided to the local controller 602 by a user interface 604.

Similarly, the local controller 602 may be coupled to the distance sensors 606 in order to determine the horizontal position of the movable pole 607. In addition, the local controller 602 may be coupled to the horizontal adjustment mechanism 605 in order to control, based upon signals received from the distance sensor 606, the horizontal position of the movable pole 607 on track 608. The local controller 602 may also be configured to control the horizontal position of the movable pole 607 based on a predetermined program stored in the local controller 602 or in response to player preferences provided to the local controller 602 by a user interface, such as touch screen.

The local controller 602 may be coupled to the scoring sensors 611 and 612 in order to determine whether a ball does or does not pass through the rim 613, and to determine the manner that the ball physically interacts with the rim 613 prior to passing through the rim 613, or prior to being deflected from rim 613. The local controller 602 may be configured to determine, process, transmit, and/or store data corresponding to the number of shots that were scored by a player and the number of shots that were missed, as well as the physical interactions between the ball and the rim prior to scoring or prior to deflection from the rim. The local controller 602 may include memory locations that are configured to store, in accordance with instructions provided by software of the local controller 602, scoring data for a particular player. The local controller 602 may also be configured to determine, process and/or store data corresponding to the number of shots that were scored by a player and the number of shots that were missed in conjunction with the horizontal and/or rotational position of the rim 613, and the interactions that the ball has with the rim 613 based on the signals from sensors 612. In this manner, the local controller 602 may provide feedback to the player indicating the player's shot percentage from different distances and angles, enabling the player to identify those shooting distances or angles which need to be improved.

The sequence of movements of the pole 607, e.g., the horizontal and rotational adjustments, as well as the height of the rim 613, may be determined by a computer-generated program of the local controller 602, which may be selected by a player prior to playing. Therefore, the basketball system 600 eliminates the need for the shooter to physically adjust, relocate or reposition the distance or shot angle of the pole 607, backboard 609 or even himself or herself prior to or during play. A player may stand in a single position and take successive shots, the local controller 602 moving either or both of the horizontal distance and the angle of rotation of the pole 607 and the backboard 609. Alternatively, a player may stand in a single position and take successive shots wherein the local controller 602 only rotates the pole 607 without moving the pole 607 horizontally. Because the central axis of the rim 613 may be coaxial with the pole 607, the player may thus practice shooting the ball at the rim from the same distance, but at different angles.

In addition, the basketball system 600, by automatically adjusting the horizontal position of the pole 607 in accordance with a predetermined program, eliminates the need for a player to horizontally reposition the pole 607, either manually or by using the user interface 604, prior to each shot. Furthermore, the basketball system 600, by automatically adjusting the rotational position of the pole 607 in accordance with the predetermined program, eliminates the need for a player to rotationally reposition the pole 607, either manually or by using the user interface 604, prior to each shot. In addition, the player does not have to reposition him or herself between shots. Embodiments may provide a feature in which a player may practice shots from an identical distance from the rim, at various different angles, while the system, e.g., the local controller 602, only needs to adjust the rotation of the pole 607, by virtue of the fact that the central axis of the rim 613 may be coaxial with the pole 607.

In one embodiment, player statistics may be gathered, analyzed, and processed in a centralized cloud computing environment. A computer program executed locally, in the cloud environment, or both may determine a skill level for each player, and for each type of play/performance (e.g., jump shot, hook shot, bank shot, free throw, layup, slam dunk, etc.) within a basketball game, the skill level may be calculated and applied to that player as a skill-level score unique to that player. For example, for each player, a skill-level score may be assigned for each type of throw/shot within a game. Players may be assigned an aggregate skill-level score, which may be a composite or a weighted composite of skill-level scores for particular shots or challenges. The skill levels may be dynamic and continuously computed and updated.

In one embodiment, a centralized database of player skill-level scores may be automatically generated and maintained and may serve as a master data set for player matching and leveling algorithms. The player matching and leveling algorithms may analyze and process the scores for each player's individual performances (shot-types), and may analyze and process an aggregate score for each player. The algorithms may employ machine learning techniques to help analyze, process, and update player skill-level scores to create best matches between players based on their respective skill-levels and playing characteristics.

In one embodiment, the centralized database of player skill-level scores may be used by the leveling algorithm, in conjunction with output from a machine learning feedback control process, or a traditional feedback control process, to provide parameters (hoop height, hoop angle, distance, sounds, lighting effects, etc.) to various local controllers 614 to increase or decrease the difficulty of the shot challenge of some players based on the skill-level gap between the players, in order to "level the playing field" such as making it more difficult for a player with a higher skill level than for a player with a lower skill level. A centralized controller, such as centralized controller 114 in FIG. 1, may communicate parameters to each basketball hoop device.

In one embodiment, an indicator may be displayed on the game board and notated in the central database for each situation (e.g., game, training session, tournament) where the skill-leveling algorithm has been applied to a player, game, or tournament. The leveling factor may be presented as an alpha-numerical figure (e.g., 1-10, 1-100, A-F, etc.) that may be proportional to any leveling adjustment necessary to equalize the challenge between the players, and the session record may be annotated accordingly. The leveling factor may appear on the graphics display as an icon with a letter and/or number to show the users that it was applied in a particular instance.

In one embodiment, the system may be provided with a user interface by which the player may activate or deactivate the skill-leveling algorithm for a particular game, training session, or tournament.

In one embodiment, the system may present a menu by which the user may select the type of session desired. Examples of session types include games, training regimes, and tournaments. When the user selects a session type, the user may be presented with a sub-menu of options for each session type. An illustrative example is provided below:

1) Training Regimen: >> Jump Shot, Hook Shot, Bank Shot, Free Throw, Layup, Slam Dunk;

2) Games: one-on-one, The Mikan Drill, Around the World, Single Person P-I-G, Ten in a Row.

Figure 2:
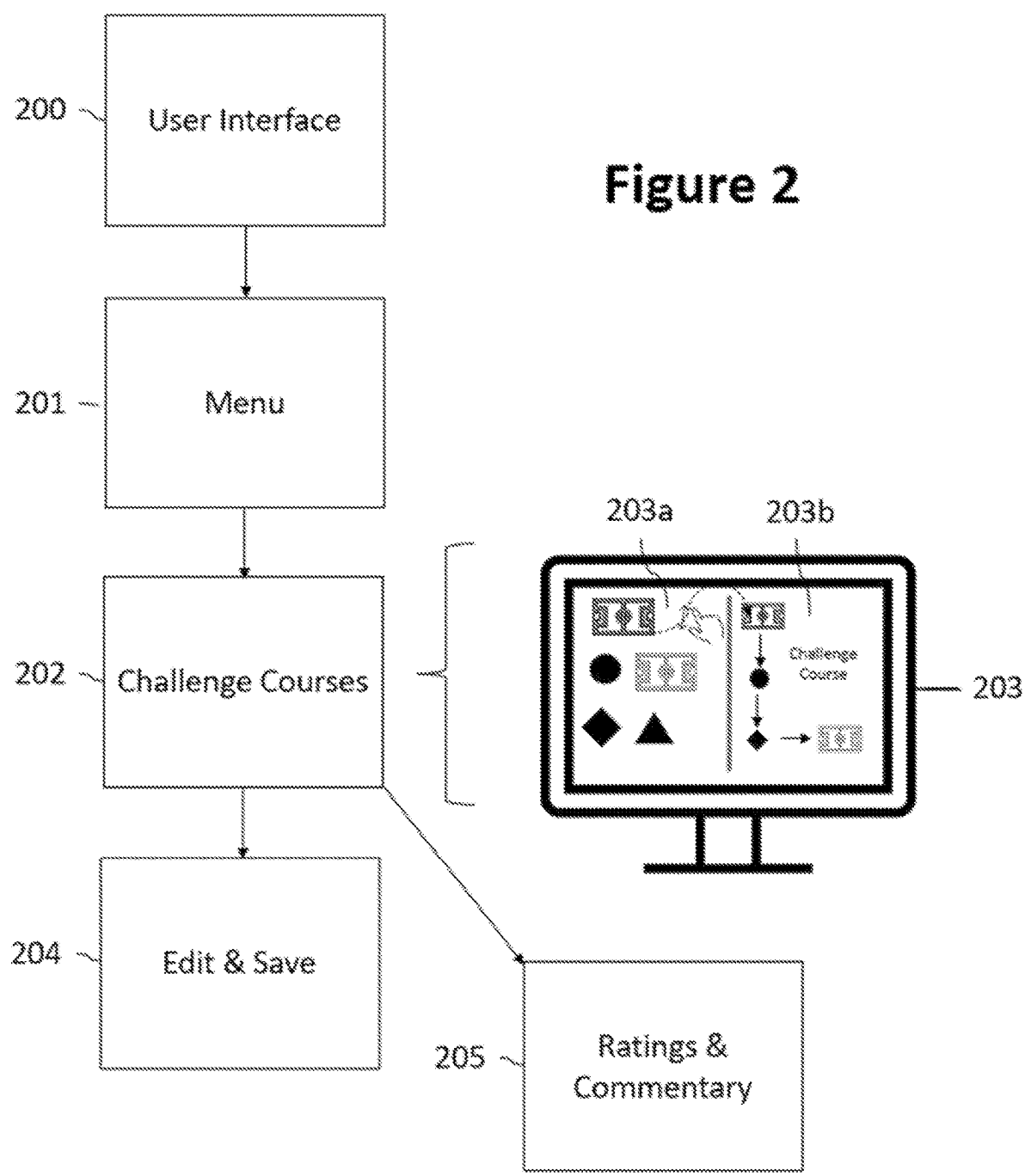
FIG. 2 depicts a method for using a basketball training system according to an embodiment.

For example, FIG. 2 depicts a method of using a basketball training system according to an embodiment. For example, the system may present a menu to a user interface 200 by which the user may create a custom configuration playing configuration. For example, a menu 201 of drag-and-drop challenge icons 203a may be available as a palette of options that may be strung together in sequence to create a player "challenge course" 203b. Embodiments may present the user with an option 204 to give the challenge course a name and to save it to their personal account for future use, or to the public cloud where user-created challenge courses may be made available to other users.

Embodiments may present a menu of "challenge courses" 202 that have been created by other users in a user interface. This interface may provide a social feature 205 that allows users to rate and comment on challenge courses to provide useful information to other players in the user community, the ratings provide opinions on the quality, difficulty level, and excitement level of the challenge course.

Figure 3:
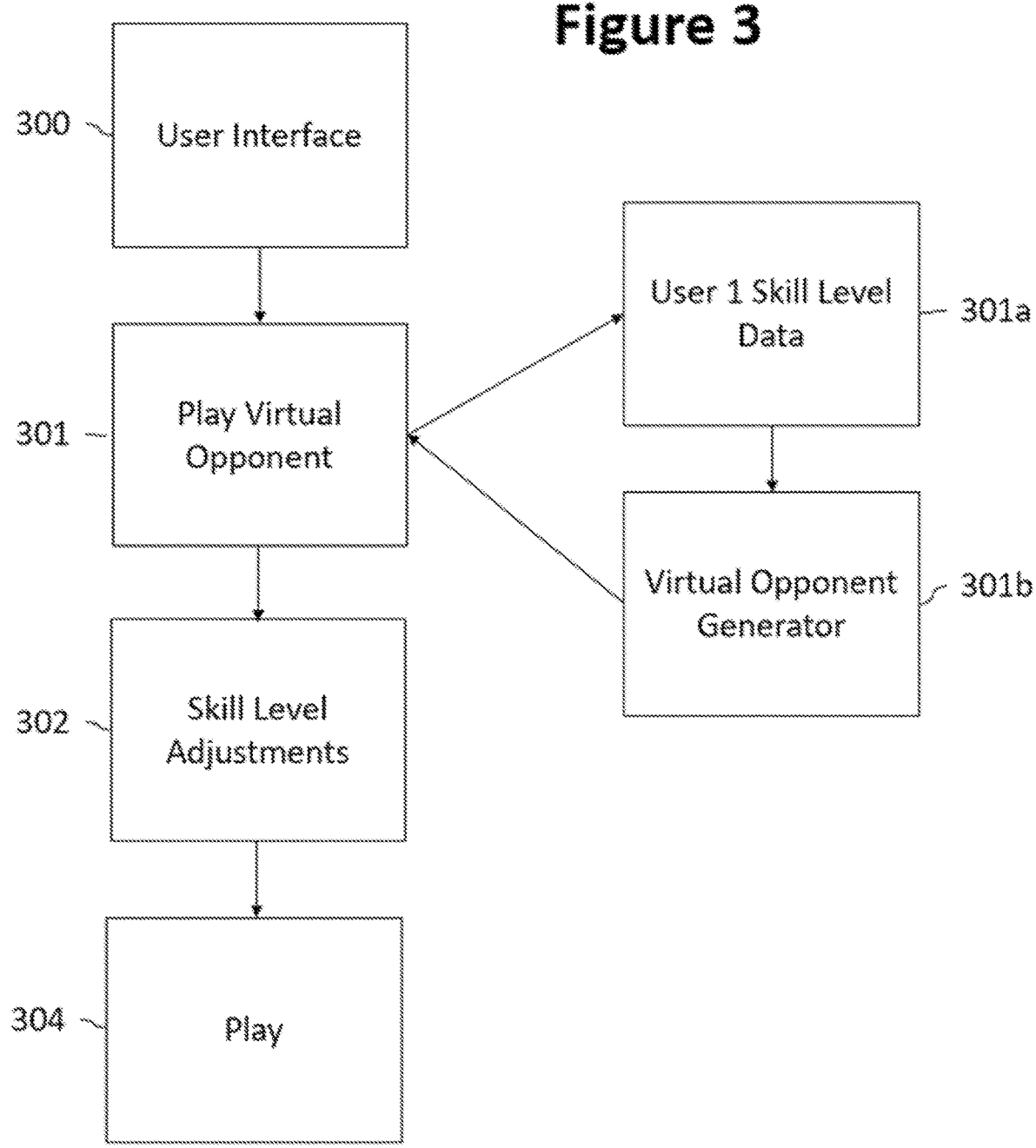
FIG. 3 depicts a method for using a basketball training system according to another embodiment.

FIG. 3 depicts a method of using a basketball training system according to another embodiment. Embodiments may present, through the user interface 300, users with options to play 304 against a computer opponent 301. For example, embodiments may use the skill level data of the user 301a to create a fictitious virtual player 301b with a skill level that is fairly matched to the user. The user may increase the skill level of the virtual opponent at any time during play by applying multiples to the virtual opponent's skill level 302 through the user interface.

Figure 4:
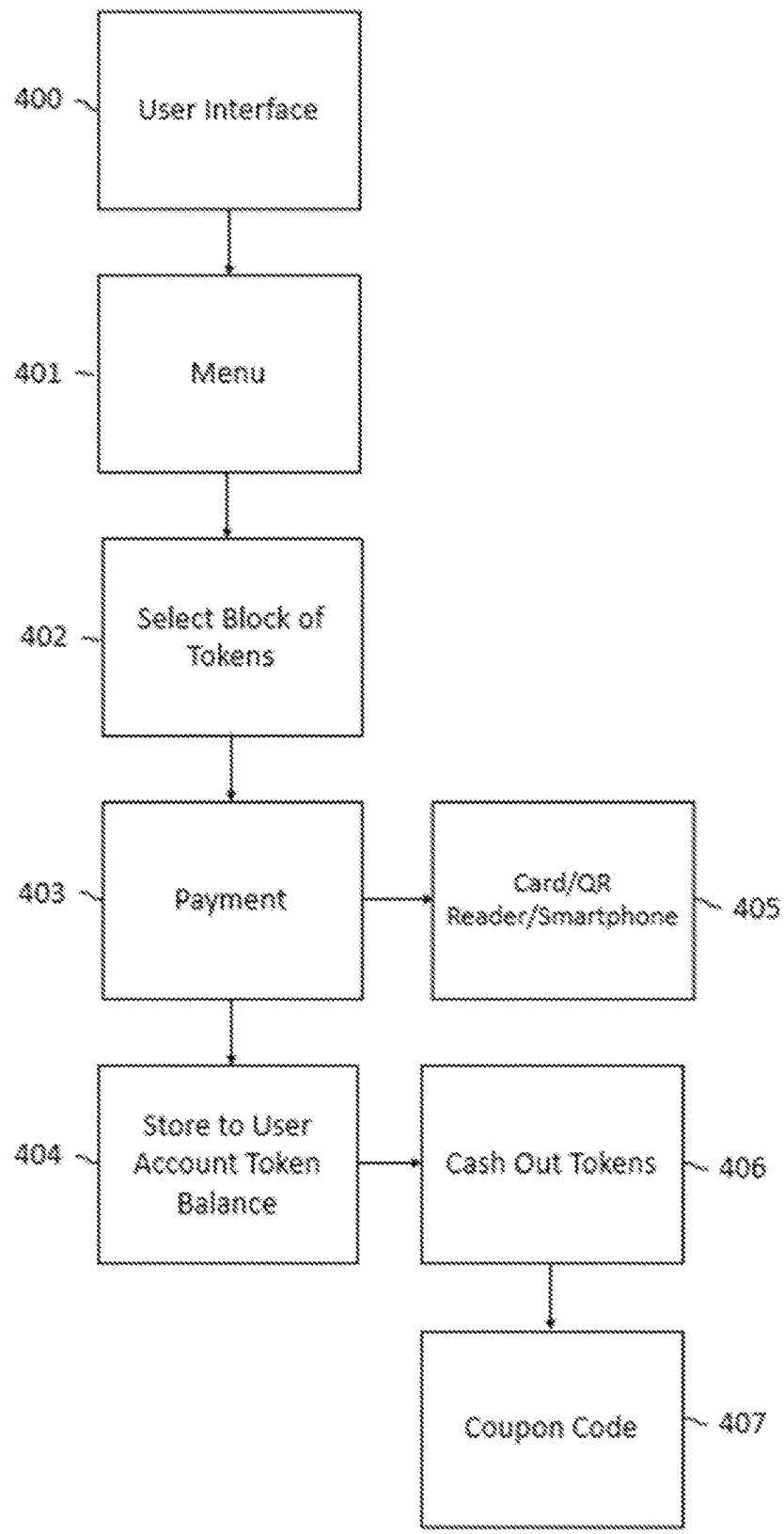
FIG. 4 depicts a method for using a basketball training system according to another embodiment.

FIG. 4 depicts a method of using a basketball training system according to another embodiment. Embodiments may provide payment processing through a user interface 400 and card reader 405 that allows the user to swipe or RFID a credit or debit card, present a QR code 405 or similar that allows the user to make a payment 403 via smartphone 405 using menu 401. In embodiments, the user interface may present the user with a menu of options to buy blocks of game tokens 402 (e.g., 25 tokens ($5), 50 tokens ($8), 100 tokens ($10)). Tokens may be added to the user account upon purchase 404; thus, if a particular game costs 10 tokens and the user has 25 tokens already in the user account, the user account will have a balance of 15 tokens after the game is purchased. Likewise, purchases of additional tokens may be added to the user's account. For example, if the user has 15 tokens in the user account and purchases a block of 25, the user now has 40 tokens as the account balance. If the user wishes to cash out tokens 406 and not play, the user may be presented with a coupon code 407 that may be used toward future token purchases or discounts on merchandise at the venue where the system resides.

Figure 5:
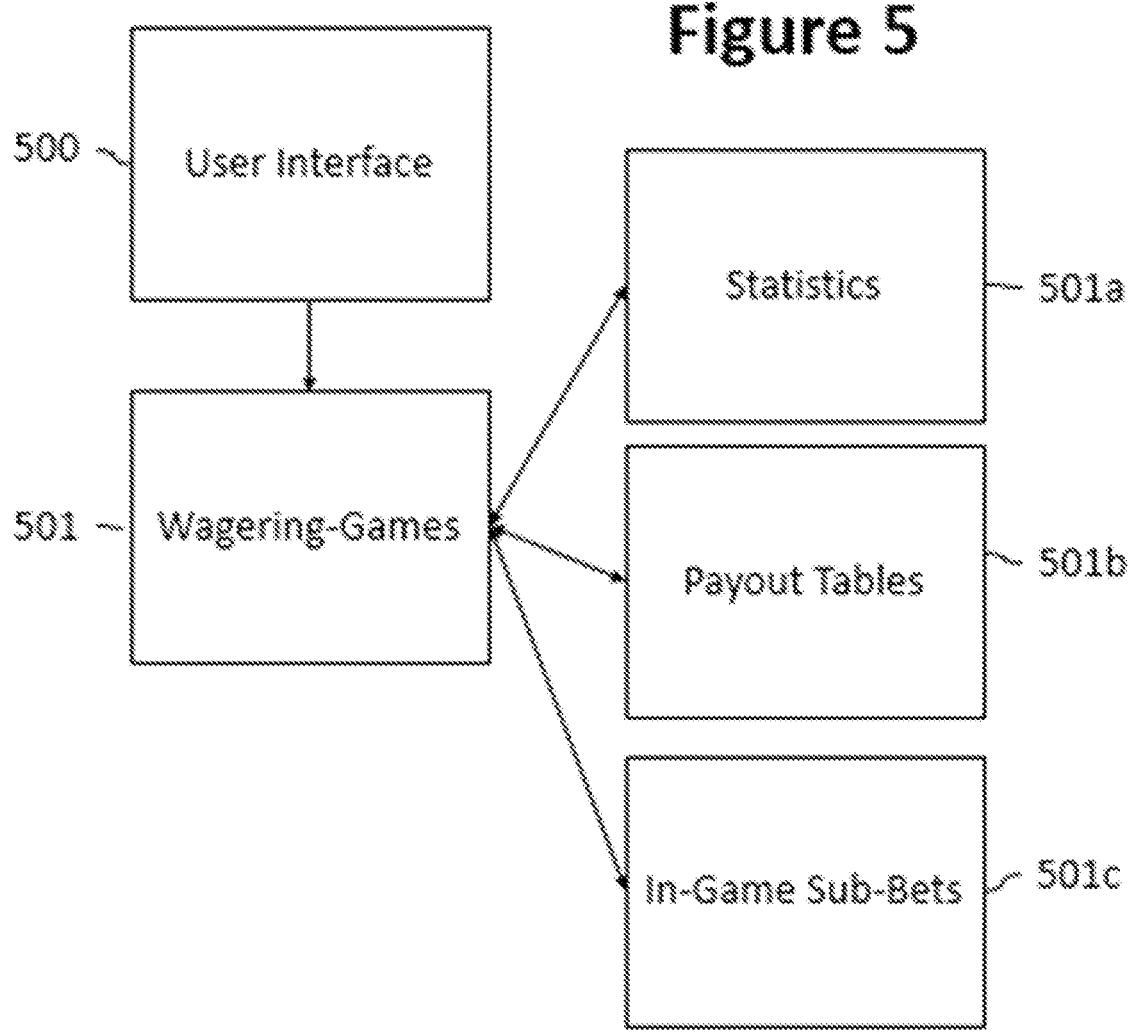
FIG. 5 depicts a method for using a basketball training system according to another embodiment.

FIG. 5 depicts a method of using a basketball training system according to another embodiment. In embodiments, a user may select wagering-games 501 from the user interface 500 as an option. The user may be presented with a menu of games 501 where tokens may be used to make wagers on various games and tournaments scheduled to take place. Users may access statistics 501a, such as Player Efficiency Rate (PER) of all players/users to see what challenges and tournaments the players have entered. In the wagering environment, the players that are involved in the challenges and tournaments may be assigned calculated odds 501a so that the wagerer may make a more informed betting decision. The wagerer may also be presented with a potential payout table 501b for a given wager and win/loss scenario. The user interface menu may also present the wagerer with an option to place sub-bets 501c on in-game performances, e.g., specific shots, misses, etc.

In embodiments, the backend may be accessed and interacted with via a mobile device, e.g., smart phones, tablet, a personal computer, smart TV, or directly on the backend's user interface.

In an embodiment, an image capture device may capture the player's image to compute the player's height, build, estimated weight, and other physical features that could have an impact in a positive or negative direction on the player's performance, and, in turn, on game and tournament outcomes. This information is fed back into the player statistics database.

Figure 7:
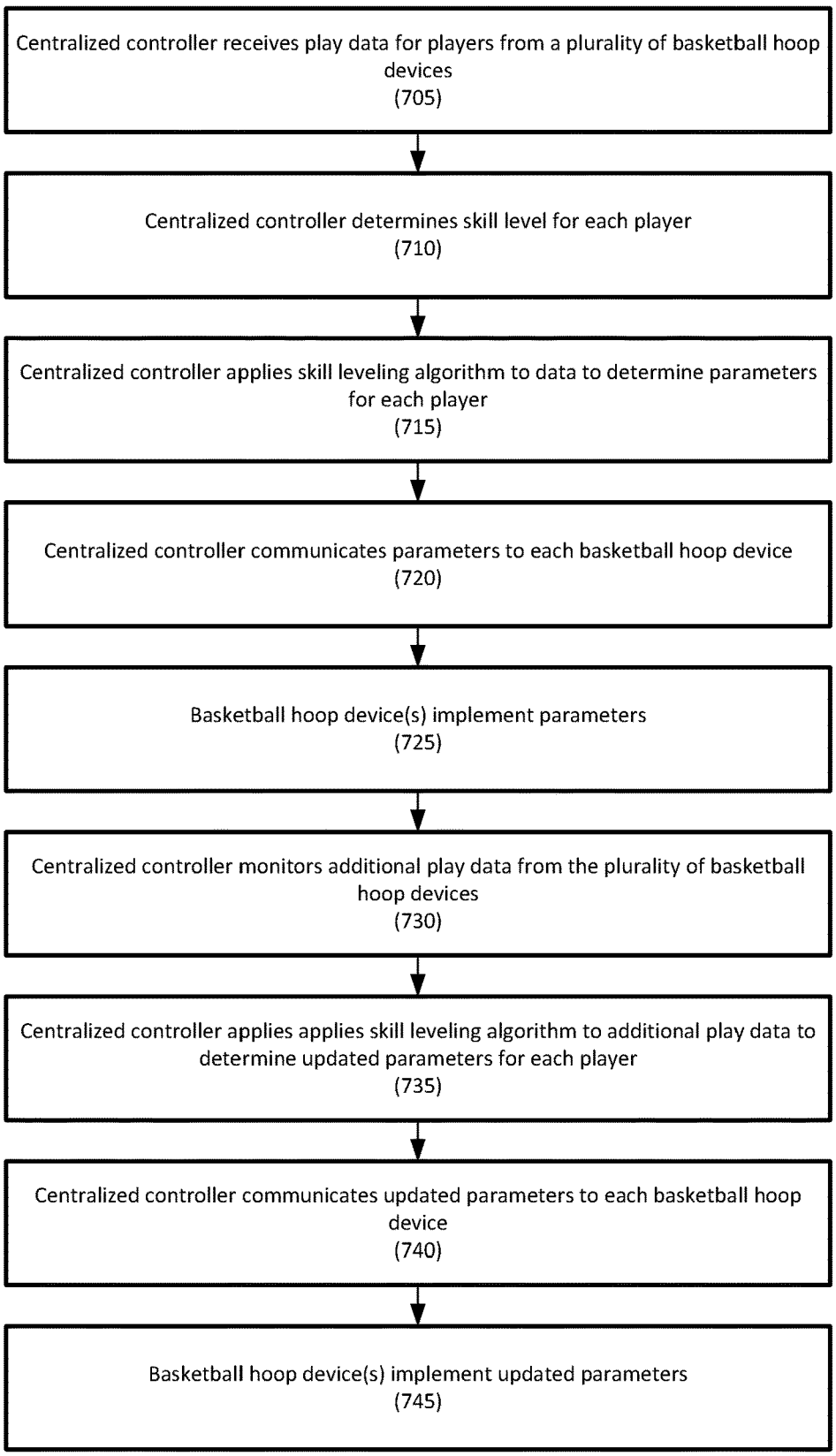
FIG. 7 depicts a method for controlling a basketball training system according to another embodiment.

FIG. 7 depicts a method for controlling a basketball training system according to another embodiment.

In step 705, a centralized controller may receive play data for players from a plurality of basketball hoop devices. The play data may include shot data, such as shot trajectory, shot angle, distance from the hoop, shot success, etc.

In step 710, the centralized controller may determine a skill level for each player from the shot data for that player. The centralized controller may implement an algorithm to determine the skill level that may consider additional factors, such as the height of the hoop, the distance to the hoop, the angle of the hoop, etc. In one embodiment, a trained machine learning engine may be used to predict the skill level of each of the players.

In step 715, the centralized controller may apply a skill leveling algorithm to determine parameters for each basketball hoop device. For example, for a lower skilled player, the centralized controller may lower the hoop, move the hoop closer, etc. For a higher skilled player, the centralized controller may raise the hoop, move it further away, may change the angle, etc.

In step 720, the centralized controller may communicate the parameters to the respective basketball hoop devices for the respective players. This may be over a network, such as the Internet, local networks, combinations, etc.

In step 725, each basketball hoop device may implement the parameters.

In step 730, the centralized controller may monitor additional play data from the basketball hoop devices. The additional play data may include data similar to that received in step 705, above.

In step 735, the centralized controller may apply a skill leveling algorithm to determine updated parameters for each basketball hoop device. For example, for a player that is underperforming other players, the centralized controller may lower the hoop, move the hoop closer, etc. For a player that is outperforming other players, the centralized controller may raise the hoop, move it further away, may change the angle, etc.

In step 740, the centralized controller may communicate the updated parameters to the respective basketball hoop devices for the respective players. This may be over a network, such as the Internet, local networks, combinations, etc.

In step 745, each basketball hoop device may implement the updated parameters.

The process may continue throughout a game or session, so that the parameters are updated in real time. The parameters may be updated automatically, periodically (e.g., after each shot, after several shots, etc.), when the score between players differs by more than a certain threshold, etc. They may also be updated manually or on-demand.

The centralized controller may store the skill level for each player and may use that as a starting point in future sessions.

The centralized controller may also identify players that have similar or the same skill levels and may match them with each other.

Embodiments may allow players to compete in real-time sessions and games (e.g., head-to-head in person and/or virtually), or may be used for asynchronous training sessions or competitions (e.g., where not all players compete at the same time).

Figure 8:
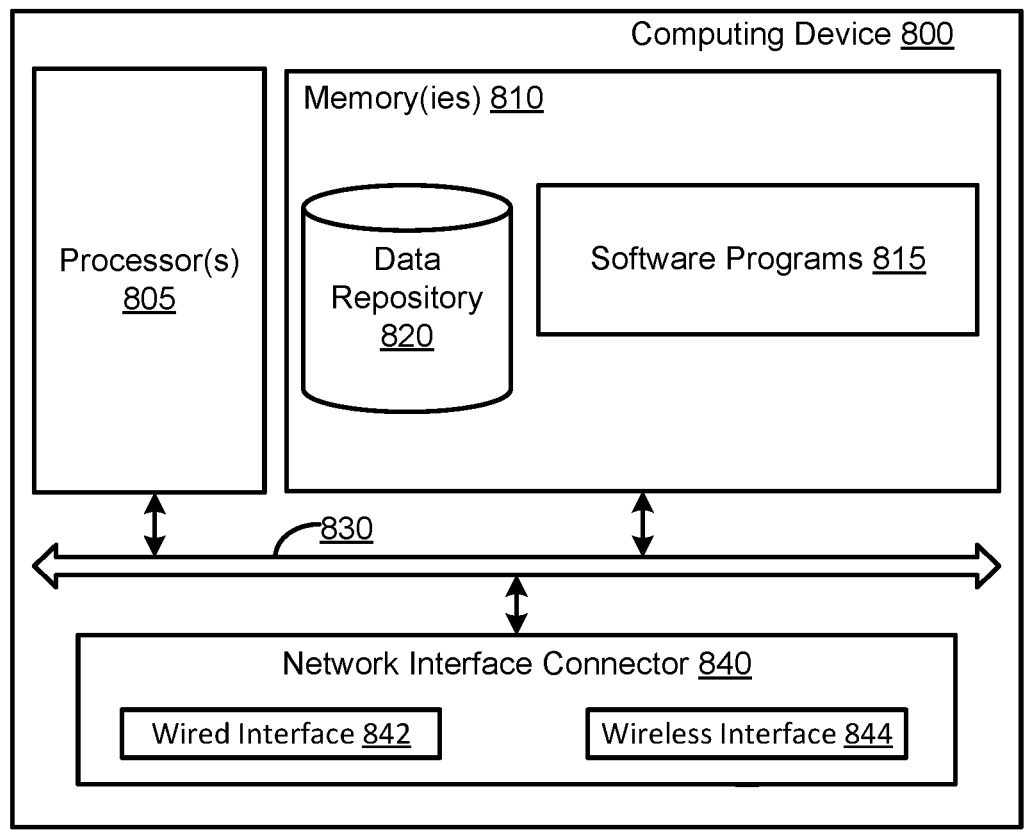
FIG. 8 depicts an exemplary computing system for implementing aspects of the present disclosure.

FIG. 8 depicts an exemplary computing system for implementing aspects of the present disclosure. FIG. 8 depicts exemplary computing device 800. Computing device 800 may represent the system components described herein. Computing device 800 may include processor 805 that may be coupled to memory 810. Memory 810 may include volatile memory. Processor 805 may execute computer-executable program code stored in memory 810, such as software programs 815. Software programs 815 may include one or more of the logical steps disclosed herein as a programmatic instruction, which may be executed by processor 805. Memory 810 may also include data repository 820, which may be nonvolatile memory for data persistence. Processor 805 and memory 810 may be coupled by bus 830. Bus 830 may also be coupled to one or more network interface connectors 840, such as wired network interface 842 or wireless network interface 844. Computing device 800 may also have user interface components, such as a screen for displaying graphical user interfaces and receiving input from the user, a mouse, a keyboard and/or other input/output components (not shown).

Although several embodiments have been disclosed, the embodiments are not exclusive, and features disclosed in one embodiment may be used with other embodiments.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system, comprising:
   a basketball hoop device comprising:
     a backboard;
     a hoop projecting from the backboard;
     a plurality of sensors configured to sense a location of a ball and a player, and a distance between the ball and the player to the hoop, and to produce output signals corresponding to the sensed location of the ball, the sensed location of the player, a distance of the ball to the hoop, and a distance of the player from the hoop; and
     a plurality of actuators configured to manipulate a hoop height, a hoop angle, and a hoop distance of the hoop:
   an electronic device comprising a computer processor that executes a computer program that:
     receives the output signals from the plurality of sensors;
     identifies, from the output signals, a plurality of shots made by the player;
     for each of the plurality of shots, calculates play data comprising a trajectory of ball flight in the shot, an angle of the shot relative to the backboard, and a distance of the player relative to the backboard, and determines whether the shot was successful, and stores the trajectory, the angle, the distance, and whether the shot was successful in a database;

calculates a skill level for the player using the play data;

applies a skill leveling algorithm to the play data to determine parameters for the basketball hoop device based on the skill level of the player, wherein the parameters comprise the hoop height, the hoop angle, and the hoop distance; and controls the plurality of actuators to manipulate the hoop height, the hoop angle, and/or the hoop distance.

2. The system of claim 1, wherein the basketball hoop device further comprises a display that presents a virtual representation of the player.

3. The system of claim 1, wherein the basketball hoop device further comprises a user interface that presents the player with an option to play against a computer opponent, and the computer program generates the computer opponent based on the output signals.

4. The system of claim 1, wherein the basketball hoop device further comprises a card reader that receives payment from a credit or debit card.

5. The system of claim 1, wherein the basketball hoop device further comprises a payment interface that presents or receives a code for payment.

6. The system of claim 1, wherein the basketball hoop device further comprises a user interface that receives a selection of a session type, wherein the session type is selected from one of a game, a training regime, and a tournament, a training regimen options comprise one of a jump shot, a hook shot, a bank shot, a free throw, a layup, and a slam dunk, and/or a game option comprise one of one-on-one, the Mikan Drill, around the world, single person p-i-g, and ten in a row; and the electronic device configures the basketball hoop device based on the selections.

7. A method, comprising:

receiving, at a local controller for a basketball hoop device, output signals from a plurality of sensors at the basketball hoop device, wherein the plurality of sensors sense a sensed location of a ball, a sensed location of a player, a distance of the ball to the hoop, and a distance of the player to the hoop;

identifying, by the local controller, and from the output signals, a plurality of shots made by the player, for each of the plurality of shots:

calculating, by the local controller, a trajectory of ball flight in the shot, an angle of the shot relative to a backboard, and a distance of the player relative to the backboard;

determining, by the local controller, whether the shot was successful; and storing, by the local controller, the trajectory, the angle, the distance, and whether the shot was successful in a database;

receiving, at a centralized controller, and from a plurality of basketball hoop devices, ball flight trajectory data, shot angle data, shot distance data, and shot success data;

calculating, by the centralized controller, a skill level for each of the plurality of players using the ball flight trajectory data, shot angle data, shot distance data, and shot success data;

applying, by the centralized controller, a skill leveling algorithm to the shot data to determine parameters for each basketball hoop device based on the skill level of each of the players, wherein the parameters comprise a hoop height, a hoop angle, and a hoop distance; and communicating, by the centralized controller, the parameters to the local controllers at the respective basketball hoop device, wherein the local controllers control actuators at the respective basketball hoop devices to manipulate the hoop height, the hoop angle, and/or the hoop distance.

8. The method of claim 7, further comprising:

monitoring, by the centralized controller, additional play data from the plurality of basketball hoop devices;

applying, by the centralized controller, the skill leveling algorithm to the ball flight trajectory data, the shot angle data, the shot distance data, and the shot success data to determine parameter updates for each basketball hoop device based on the additional play data, wherein the parameter updates comprise a hoop height modification, a hoop angle modification, and a hoop distance modification; and communicating, by the centralized controller, the parameter updates to local controllers at the respective basketball hoop device, wherein the local controllers control actuators at the respective basketball hoop devices to implement the hoop height modification, the hoop angle modification, and the hoop distance modification.

9. The method of claim 8, wherein the skill leveling algorithm identifies parameters to make play easier for a first player having a lower skill level than a second player.

10. The method of claim 8, wherein the skill leveling algorithm identifies parameters to make play more difficult for a first player having a higher skill level than a second player.

11. The method of claim 8, further comprising:

storing, by the centralized controller, the skill level for each player.

12. The method of claim 8, further comprising:

identifying, by the centralized controller, players in a plurality of players having a same skill level; and matching, by the centralized controller, the players having the same s kill level with each other.

13. The method of claim 8, wherein the plurality of players play the same game in real-time, wherein the game comprises one-on-one, The Mikan Drill, Around the World, P-I-G, or Ten in a Row.

14. A system, comprising:

a plurality of basketball hoop devices, each basketball hoop device comprising:

a backboard;

a hoop projecting from the backboard;

a plurality of sensors configured to sense a location of a ball and a player, and a distance between the ball and the player to the hoop, and to produce output signals corresponding to the sensed location of the ball, the sensed location of the player, a distance of the ball to the hoop, and a distance of the player from the hoop;

a plurality of actuators configured to manipulate a hoop height, a hoop angle, and a hoop distance of the hoop; and a local controller comprising a computer processor that executes a computer program that:

receives the output signals from the plurality of sensors;

identifies, from the output signals, a plurality of shots made by the player; and for each of the plurality of shots:

calculates ball flight trajectory data, shot angle data, and shot distance data; and determines shot success data comprising whether the shot was successful;

a centralized controller that is configured to receive, from the plurality of basketball hoop devices, the ball flight trajectory data, the shot angle data, the shot distance data, and the shot success data; to calculate a skill level for each of the plurality of players using the ball flight trajectory data, shot angle data, shot distance data, and shot success data; to apply a skill leveling algorithm to the shot data to determine parameters for each basketball hoop device based on the skill level of each of the players, wherein the parameters comprise a hoop height, a hoop angle, and a hoop distance; and to communicate the parameters to the local controllers at the respective basketball hoop device, wherein the local controllers control actuators at the respective basketball hoop devices to manipulate the hoop height, the hoop angle, and/or the hoop distance.

15. The system of claim 14, wherein the centralized controller is further configured to:

monitor additional play data from the plurality of basketball hoop devices;

apply the skill leveling algorithm to the ball flight trajectory data, the shot angle data, the shot distance data, and the shot success data to determine parameter updates for each basketball hoop device based on the additional play data, wherein the parameter updates comprise a hoop height modification, a hoop angle modification, and a hoop distance modification; and communicate the parameter updates to local controllers at the respective basketball hoop devices;

the local controllers are configured to control actuators at the respective basketball hoop devices to implement the hoop height modification, the hoop angle modification, and the hoop distance modification.

16. The system of claim 15, wherein the skill leveling algorithm identifies parameters to make play easier for a first player having a lower skill level than a second player.

17. The system of claim 15, wherein the skill leveling algorithm identifies parameters to make play more difficult for a first player having a higher skill level than a second player.

18. The system of claim 14, further comprising:

storing, by the centralized controller, the skill level for each player.

19. The system of claim 14, wherein the centralized controller is further configured to:

identify players in a plurality of players having a same skill level; and match the players having the same skill level with each other.

20. The system of claim 14, wherein the plurality of players play the same game in real-time, wherein the game comprises one-on-one, The Mikan Drill, Around the World, P-I-G, or Ten in a Row.

* * * * *